United States Patent [19]

Warmington

[11] Patent Number: 4,995,777
[45] Date of Patent: Feb. 26, 1991

[54] FASTENER WITH SELF-RETAINING COLLAR

[75] Inventor: John H. Warmington, Culver City, Calif.

[73] Assignee: VSI Corporation, Culver City, Calif.

[21] Appl. No.: 506,665

[22] Filed: Apr. 9, 1990

[51] Int. Cl.⁵ .............................................. F16B 19/00
[52] U.S. Cl. .................................... 411/361; 411/512; 411/533
[58] Field of Search ............... 411/283, 361, 437, 512, 411/533, 338, 339, 352, 353; 403/285, 377

[56] References Cited

U.S. PATENT DOCUMENTS

| | | | |
|---|---|---|---|
| 3,295,404 | 1/1967 | Baker | 411/361 |
| 4,813,834 | 3/1989 | Smith | 411/361 |
| 4,867,625 | 9/1989 | Dixon | 411/361 |
| 4,892,000 | 1/1990 | Renk et al. | 411/533 |

Primary Examiner—Neill R. Wilson
Attorney, Agent, or Firm—Christie, Parker & Hale

[57] ABSTRACT

A self-retaining collar for a pin of a two-piece fastener has a projection or detent from its inner surface for engaging locking grooves of the pin. The pin has a head and a shank, the locking grooves being formed on the shank. The fastener holds two or more workpieces together in tension by inserting the pin through the workpieces until the head contacts one side of the workpieces and the locking grooves extend through the other side. The shank has pulling grooves located on the side opposite the head. Once the pin is through the workpieces, the collar is slid over the shank until the detent engages the lands of one of the locking grooves. The collar will thus stay in place around the locking grooves even when the force of gravity tends to pull the collar off of the grooves. The collar is then swaged into the locking grooves while the workpieces are placed in tension by pulling on the pulling grooves of the pin.

17 Claims, 1 Drawing Sheet

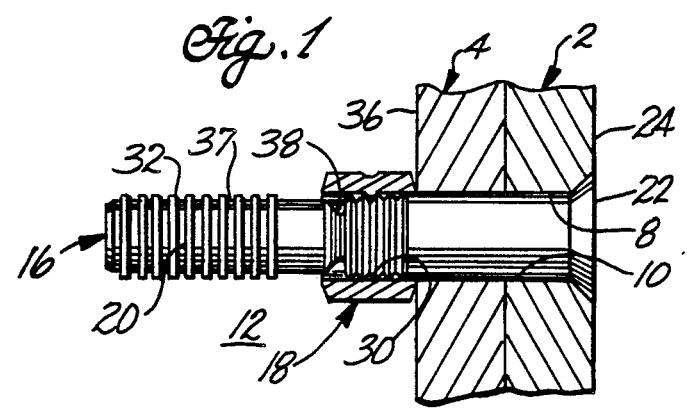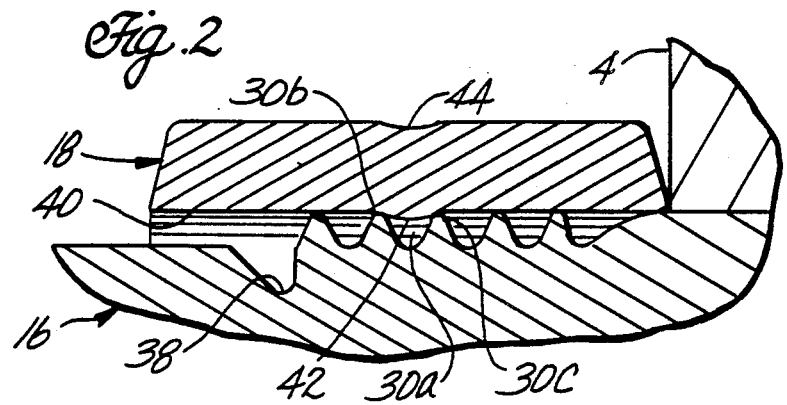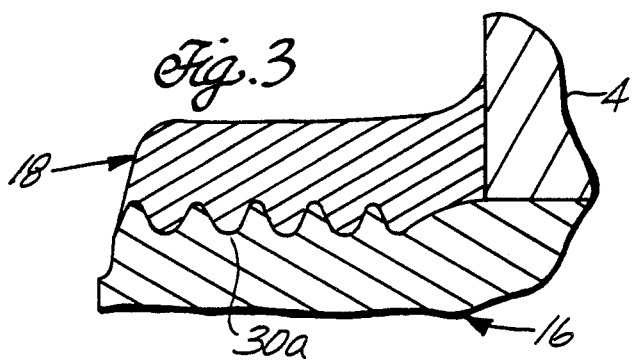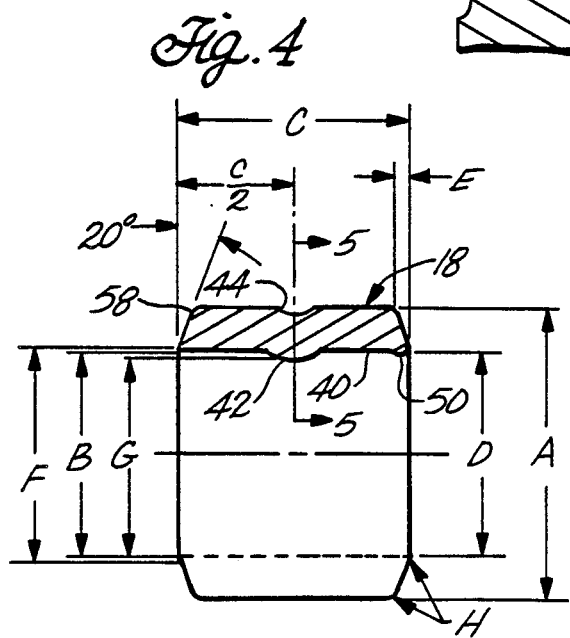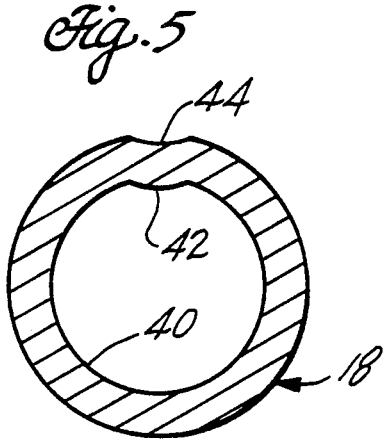

FASTENER WITH SELF-RETAINING COLLAR

BACKGROUND OF THE INVENTION

The present invention relates to a two-piece fastener having a pin and a swagable collar and, more particularly, to such a fastener having a design suitable for use where the collar tends to fall off the pin because of gravity.

Two-piece fasteners of the pin and swagable collar are well known in the art, e.g. as disclosed in U.S. Pat. No. 2,531,048 to Huck, and are often called lockbolts. The pin has a head at one end for engaging a surface of the work and a shank that protrudes from the other side of the work. Pulling grooves on the shank enable the pin to be pulled by a tool to put the work in compression. A variation of this fastener is shown in U.S. Pat. No. 4,472,096 to Ruhl, et al. This latter patent discloses a pin and swagable collar but the pin does not have pulling grooves. This type of pin is known as a stump type pin.

The protruding shank of the pin also has locking grooves. One slides the collar over the shank of the pin so that it abuts the work and is over the locking grooves. One then pulls on the pulling grooves and reacts the pulling force on a swaging tool to swage the collar into the locking grooves to form a joint.

Conventionally, the collar has a constant internal diameter for a slip fit over the pin shank. Because of the slip fit, it is difficult to keep the collar on the locking grooves when the collar is below the work because of gravity. One solution to this problem uses an elastomer in the roller to engage the locking grooves and hold the collar in position. However, this solution significantly increases the cost of manufacturing the collar. Accordingly, a reliable self-retaining collar that is inexpensive to manufacture is needed.

SUMMARY OF THE INVENTION

The present invention provides the combination of a pin and a swagable collar with the collar having a detent on its inner surface for engaging the locking grooves to keep the collar on the pin regardless of pin position. In the preferred embodiment, the collar is dimpled to form the detent, and the detent is rounded and snaps into place in a pin locking groove, between adjoining lands of the groove.

The centrally located self-retaining detent making the collar non-directional provides a substantial advantage when collars are fed automatically by a tool. Because of the self-retaining detent, there is no requirement for complicated sensing and mechanical devices to orient the collar in a selected direction for the self-retaining feature to function correctly at the assembly station. The self-retaining feature is integral within the collar itself, not an insert attached by some method that could detach itself from the collar in shipment or prior to assembly, thus causing foreign object debris not acceptable in aircraft assembly areas. The collar can also be used with threaded fasteners that are used with swaged collars in applications where wrenches are not accessible, for example, aircraft frame stringers, or with threaded fastener systems designed to accept swaged collars as well as free running and prevailing locking torque nuts.

These and other features and aspects of the present invention will become more apparent with reference to the following Detailed Description, drawings and appended claims.

BRIEF DESCRIPTION OF THE DRAWINGS

FIG. 1 is a cross-sectional view of two workpieces, and a pin, and a collar, according to the invention, for fastening the workpieces together;

FIG. 2 is an enlarged cross-sectional view of the collar and its engagement with locking grooves of the pin according to the invention;

FIG. 3 is an enlarged cross-sectional view similar to FIG. 2 but taken after the collar has been swaged onto the locking grooves of the pin bolt;

FIG. 4 is a half cross-sectional view of the collar; and

FIG. 5 is a cross-sectional view of the collar taken along line 5—5 of FIG. 4.

DETAILED DESCRIPTION

The invention is a two-piece fastener of a pin and a self-retaining collar, i.e., a collar that stays on the pin regardless of the directional orientation of the pin.

FIG. 1 shows a cross-sectional view of a two-piece fastening system for holding two or more workpieces 2 and 4 together. Workpieces 2 and 4 have aligned holes 8 and 10. The fastening system is generally indicated by reference numeral 12 and includes a pin 16 and collar 18. Pin 16 has a shank 20 that fits through holes 8 and 10 and a head 22 that abuts a surface 24 of workpiece 2. As is well known in the art, shank 20 has a set of locking grooves 30 and a set of pulling grooves 32. The locking grooves are located on a part of shank 20 that extends outside of holes 8 and 10 so that there is a predetermined distance between the locking grooves and a surface 36 of workpiece 4. The pulling grooves are located on tail 37 of shank 20 opposite head 22. A break neck 38 joins the tail to the balance of the shank and breaks with the formation of a joint.

FIG. 2 is an enlarged sectional view of the collar and its engagement with the locking grooves of the pin. Collar 18 has an inner right cylindrical surface 40 of a diameter sized to just slip over shank 20 and locking grooves 30, although the portion of shank 20 between the locking grooves and head 22 may have a larger diameter than collar 18. Inner surface 40 has an inwardly projecting detent 42 sized and positioned so that the collar 18 elastically deforms as it slides over shank 20 and into position around locking grooves 30. Accordingly, when collar 18 is properly positioned around the locking grooves, detent 42 frictionally engages lands 30b and 30c on either side of a groove 30a to retain the collar on shank 20.

When collar 18 is in position around locking grooves 30, one sets the fastener using a "swaging" tool, such as disclosed in U.S. Pat. No. 2,531,048 which is incorporated here by reference. The swaging tool pulls on tail 37 until a predetermined tension is reached, and break neck 38 fails. During this tensioning, the swaging tool swages collar 18 into locking grooves 30.

FIG. 3 is an enlarged sectional view similar to FIG. 2, but shows the collar after it has been swaged into the locking grooves. Upon swaging, the collar will mold to the locking grooves.

FIGS. 4 and 5 are sectional views, of the collar, showing the shape of detent 42, which is created by a dimple 44 from the outer surface of collar 18. While detent 42 has a rounded shape in the drawings, it may have any appropriate shape which projects from inner surface 40 to engage the lands and sides of a locking groove to retain collar 18 in position on the pin.

Typically, in aerospace applications, the workpieces are aluminum, the collar is aluminum, and the pin is titanium. For example, 2024-T42 aluminum alloy is suitable for the collar, and 6AL-4V titanium alloy is suitable for the pin. Suitable dimensions (in inches) for a collar and pin are shown in Table 1 below, with reference to the labels in FIG. 4:

TABLE 1

| Pin/ Collar Size Code | Nom Size of Pin | A ± .002 | B ± .002 | C ± .010 | D Min | E Max | F Max | G Ref ± .0025 | Dimple Radius | Locking Groove Dia.(Max) | Pulling Groove Dia.(Max) |
|---|---|---|---|---|---|---|---|---|---|---|---|
| 05 | .164 | .245 | .163 | .221 | .157 | .016 | .188 | .152 | .046 | .156 | .156 |
| 06 | .190 | .270 | .190 | .225 | .185 | .016 | .212 | .180 | .046 | .184 | .184 |
| 08 | .250 | .356 | .249 | .283 | .245 | .016 | .280 | .240 | .062 | .244 | .244 |
| 10 | .312 | .446 | .312 | .334 | .307 | .031 | .351 | .302 | .093 | .306 | .306 |
| 12 | .375 | .531 | .376 | .374 | .371 | .031 | .421 | .366 | .093 | .370 | .368 |

In FIG. 4, dimensions A and B are the outer and inner diameters of the collar, respectively, and C is the length. In the drawings, detent 42 is centered at length C/2. Dimensions D and E represent the limits of a punch out burr 50 or other formation imperfection in the collar's inner surface. Dimension F is the diameter to the start of conical (20°) taper 58, and G is the distance between the tip of the detent and the opposite side of the collar. Arrows H represent a 0.040 radius at the indicated edge.

Lubricant may be used for the inner surface of the collar, such as cetyl alcohol, preferably chlorine-free.

The collar according to the invention was tested for tensile strength to ensure that its strength was not adversely affected as compared with a conventional, smooth inner-surface collar. A minimum of seven dimpled collars for each pin and collar size shown in Table 1 were tensile tested using a Tinius-Olsen 120,000 pound tension testing machine. It was determined that the tensile strength of the collar was not adversely affected by the dimple and detent.

The invention, which is defined in the claims, is not limited to the disclosed embodiment, as other variations will be evident to one of ordinary skill in the art. For example, the detent could take other shapes such as slanted surfaces rather than the rounded shape shown in the drawings. In addition, the head of the pin may take any suitable shape, with the portion of the bore in the first workpiece being appropriately shaped to receive the head.

The invention is also not limited to the pull-type fasteners explicitly described. The collar self-retaining feature can be used on stump-type pins that are used with both manual squeeze-type installation tools and automated assembly equipment.

What is claimed is:

1. A dimpled collar adapted for being swaged into locking grooves of a pin, the collar comprising:
   a substantially right cylindrical member having a central bore, and an outer surface having a symmetrically located dimple which creates a detent of the collar material extending into the bore, the cylindrical member having an inner diameter slightly greater than an outer diameter of the locking grooves, except that the inner diameter of the cylindrical member at the detent is slightly smaller than the outer diameter of the locking grooves for frictionally engaging at least one of the locking grooves, the cylindrical member and detent being sufficiently resilient for sliding the collar over the locking grooves.

2. The collar of claim 1 wherein the collar comprises an aluminum alloy.

3. The collar of claim 1 wherein the detent has a rounded shape.

4. The collar of claim 1 wherein a dimple is formed in an outer surface of the cylindrical member in a position corresponding to that of the detent.

5. The collar of claim 1 wherein the detent is adapted to engage two adjacent lands forming one groove of the locking grooves of the pin.

6. A dimpled collar adapted for being swaged into locking grooves of a pin, the collar comprising:
   a substantially right cylindrical member having a central bore, and a detent of the collar material extending into the bore, the cylindrical member having an inner diameter slightly greater than an outer diameter of the locking grooves, except that the inner diameter of the cylindrical member at the detent is a minimum of 15 ten-thousandths of an inch smaller than the outer diameter of the locking grooves and a maximum of 65 ten-thousandths of an inch smaller than the outer diameter of the locking grooves.

7. A fastener for holding at least two workpieces together, the fastener comprising:
   a pin having a substantially cylindrical shank, and a head located at one end of the shank, the pin further having locking grooves formed in the shank; and
   a dimpled collar comprising a substantially cylindrical member having a central bore, and having a symmetrically located dimple which creates a detent of the collar material extending into the bore, the cylindrical member having an inner diameter slightly greater than an outer diameter of the locking grooves, except that the inner diameter of the cylindrical member at the detent is slightly smaller than the outer diameter of the locking grooves for frictionally engaging at least one of the locking grooves, the cylindrical member and dent being sufficiently resilient for sliding the collar over the locking grooves from an end of the shank opposite the head.

8. The fastener of claim 7 wherein the pin has pulling grooves formed in the shank remote from the head with respect to the locking grooves.

9. The fastener of claim 7 wherein the collar and pin member each comprise an aluminum alloy.

10. The fastener of claim 7 wherein the detent has a rounded shape.

11. The fastener of claim 7 wherein a dimple is formed in an outer surface of the cylindrical member in a position corresponding to that of the detent.

12. The fastener of claim 7 wherein the detent is adapted to engage two adjacent lands forming one groove of the locking grooves.

13. The fastener of claim 8 wherein the pin has a break neck disposed proximate the locking grooves and between the locking grooves and the pulling grooves.

14. A joint assembly comprising:
   a plurality of workpieces:
   a pin having a substantially cylindrical shank, a head located at one end of the shank, and locking grooves formed in the shank, the shank extending through the workpieces with the head abutting one side of the workpieces and the locking grooves adjacent the other side of the workpieces; and
   a dimpled collar comprising a substantially right cylindrical member having a central bore, and an outer surface having a symmetrically located dimple midway between the ends of the collar which creates a detent of the collar material extending into the bore, the cylindrical member having an inner diameter slightly greater than an outer diameter of the locking grooves, except that the inner diameter of the cylindrical member at the detent is slightly smaller than the outer diameter of the locking grooves for frictionally engaging at least one of the locking grooves, the collar being swaged into the locking grooves and in contact with the other side of the workpieces for holding the workpieces together in compression.

15. The joint assembly of claim 14 wherein the collar, pin and workpieces each comprise an aluminum alloy.

16. The joint assembly of claim 14 wherein the detent has a rounded shape.

17. A fastener for holding at least two workpieces together, the fastener comprising:
   a pin having a substantially cylindrical shank, and a head located at one end of the shank, the pin further having locking grooves formed in the shank; and a dimpled collar comprising a substantially cylindrical member having a central bore, and a detent of the collar material extending into the bore, the cylindrical member having an inner diameter slightly greater than an outer diameter of the locking grooves, except that the inner diameter of the substantially cylindrical member at the detent is a minimum of 15 ten-thousandths of an inch smaller than the outer diameter of the locking grooves and a maximum of 65 ten-thousandths of an inch smaller than the outer diameter of the locking grooves.

* * * * *